United States Patent
Morimoto et al.

(10) Patent No.: US 11,077,858 B2
(45) Date of Patent: Aug. 3, 2021

(54) VEHICLE DRIVER STATE DETERMINATION APPARATUS

(71) Applicant: DENSO CORPORATION, Kariya (JP)

(72) Inventors: Hiroshi Morimoto, Kariya (JP); Ayako Tsunoda, Kariya (JP); Kaneyoshi Ueda, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/431,985

(22) Filed: Jun. 5, 2019

(65) Prior Publication Data

US 2019/0283764 A1 Sep. 19, 2019

Related U.S. Application Data

(63) Continuation of application No. PCT/JP2017/038158, filed on Oct. 23, 2017.

(30) Foreign Application Priority Data

Dec. 22, 2016 (JP) .............................. JP2016-249190

(51) Int. Cl.
| | |
|---|---|
| *B60W 40/09* | (2012.01) |
| *B60W 50/16* | (2020.01) |
| *G06F 3/01* | (2006.01) |
| *G06K 9/00* | (2006.01) |
| *B60R 21/00* | (2006.01) |

(Continued)

(52) U.S. Cl.
CPC ............. *B60W 40/09* (2013.01); *B60R 21/00* (2013.01); *B60W 30/08* (2013.01); *B60W 30/17* (2013.01); *B60W 40/08* (2013.01); *B60W 50/14* (2013.01); *B60W 50/16* (2013.01); *G06F 3/013* (2013.01); *G06K 9/00845* (2013.01); *G08G 1/16* (2013.01); *B60W 2040/0818* (2013.01); *B60W 2050/146* (2013.01)

(58) Field of Classification Search
CPC ......... B60W 2040/0818; B60W 50/16; B60W 50/14; B60W 40/08; B60W 30/17; B60W 30/08; B60W 40/09; G06K 9/00832; G06K 9/00845; G08G 1/16; B60R 21/00
See application file for complete search history.

(56) References Cited

U.S. PATENT DOCUMENTS

| | | | |
|---|---|---|---|
| 9,079,526 B2 | 7/2015 | Ishikawa | |
| 2008/0042813 A1* | 2/2008 | Wheatley | G08G 1/166 340/435 |

(Continued)

FOREIGN PATENT DOCUMENTS

| | | |
|---|---|---|
| JP | 2006350697 A | 12/2006 |
| JP | 2007245955 A | 9/2007 |

(Continued)

*Primary Examiner* — Carlos Garcia
(74) *Attorney, Agent, or Firm* — Harness, Dickey & Pierce, P.L.C.

(57) ABSTRACT

A vehicle driver state determination apparatus in a vehicle is provided as follows. A specific notification is issued from a driving assistance apparatus in response to an occurrence of a specific event; the specific notification urges the driver to perform a predetermined driving operation. A reaction time is measured from when the specific notification is issued to when the predetermined driving operation is performed by the driver, to evaluate a state relating to a driving ability of the driver.

17 Claims, 4 Drawing Sheets

(51) Int. Cl.
    *B60W 30/08*     (2012.01)
    *B60W 50/14*     (2020.01)
    *B60W 30/17*     (2020.01)
    *B60W 40/08*     (2012.01)
    *G08G 1/16*     (2006.01)

(56) References Cited

U.S. PATENT DOCUMENTS

| | | | | |
|---|---|---|---|---|
| 2008/0042814 A1* | 2/2008 | Hurwitz | ............... | B60W 50/14 |
| | | | | 340/435 |
| 2017/0140232 A1* | 5/2017 | Banno | ................... | A61B 5/1114 |
| 2017/0161575 A1* | 6/2017 | Banno | ............... | G06K 9/00342 |

FOREIGN PATENT DOCUMENTS

| | | |
|---|---|---|
| JP | 2009099048 A | 5/2009 |
| JP | 2011148426 A | 8/2011 |
| JP | 5533938 B2 | 6/2014 |
| JP | 2015018503 A | 1/2015 |

\* cited by examiner

VEHICLE DRIVER STATE DETERMINATION APPARATUS

CROSS REFERENCE TO RELATED APPLICATIONS

The present application is a continuation application of International Patent Application No. PCT/JP2017/038158 filed on Oct. 23, 2017, which designated the United States and claims the benefit of priority from Japanese Patent Application No. 2016-249190 filed on Dec. 22, 2016. The entire disclosures of all of the above applications are incorporated herein by reference.

TECHNICAL FIELD

The present disclosure relates to a vehicle driver state determination apparatus, which is in a vehicle having a driving assistance apparatus, to determine a state of a driver of the vehicle.

BACKGROUND

There is conventionally known a driving ability reduction determination apparatus as a technique for determining a reduction in driving ability due to fatigue or the like of a driver who drives a vehicle, for example, an automobile. While the vehicle is traveling, the driving ability reduction determination apparatus is configured to display an image for determination as a virtual image on the windshield. The driving ability reduction determination apparatus is further configured (i) to measure a reaction time to when the driver operates a predetermined button for measurement by reacting to the light stimulus of the displayed image, (ii) to determine the reduction in the driving ability based on the reaction time, and (iii) to call attention as necessary.

SUMMARY

According to an example of the present disclosure, a vehicle driver state determination apparatus in a vehicle is provided as follows. A specific notification is issued from a driving assistance apparatus in response to an occurrence of a specific event; the specific notification urges the driver to perform a predetermined driving operation. A reaction time is measured from when the specific notification is issued to when the predetermined driving operation is performed by the driver, to evaluate a state relating to a driving ability of the driver.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

(1) First Embodiment

Figure 1:
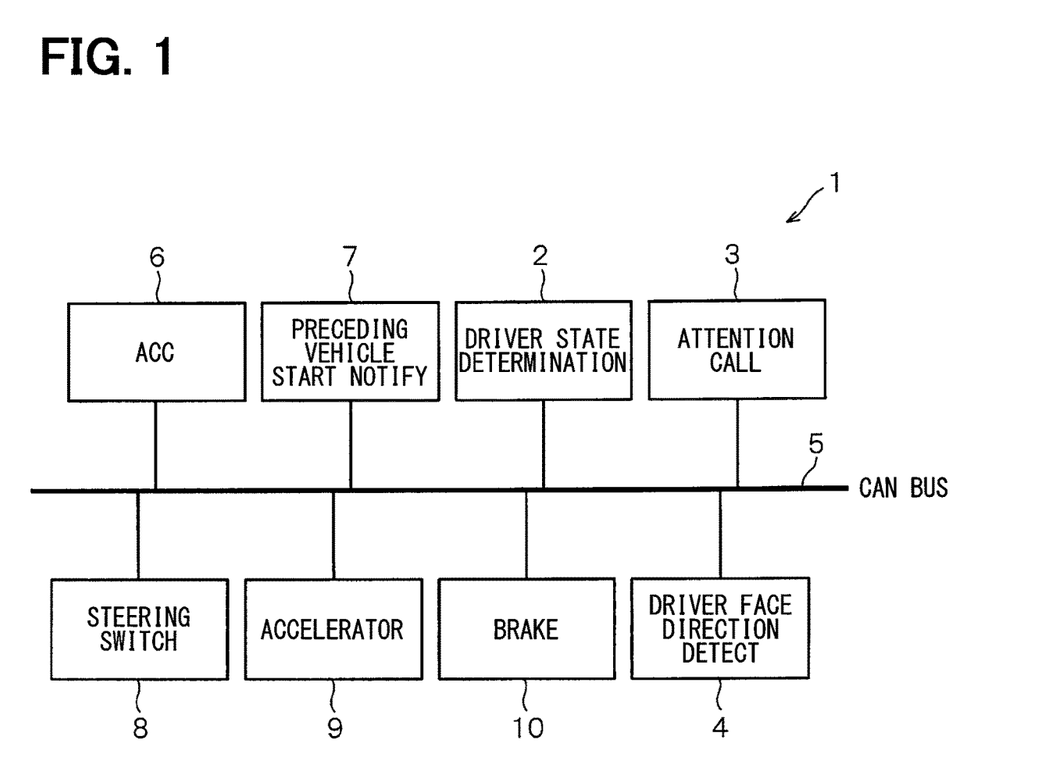
FIG. 1 is a block diagram schematically showing an electrical configuration of a vehicle driver state determination apparatus according to a first embodiment.
Figure 2:
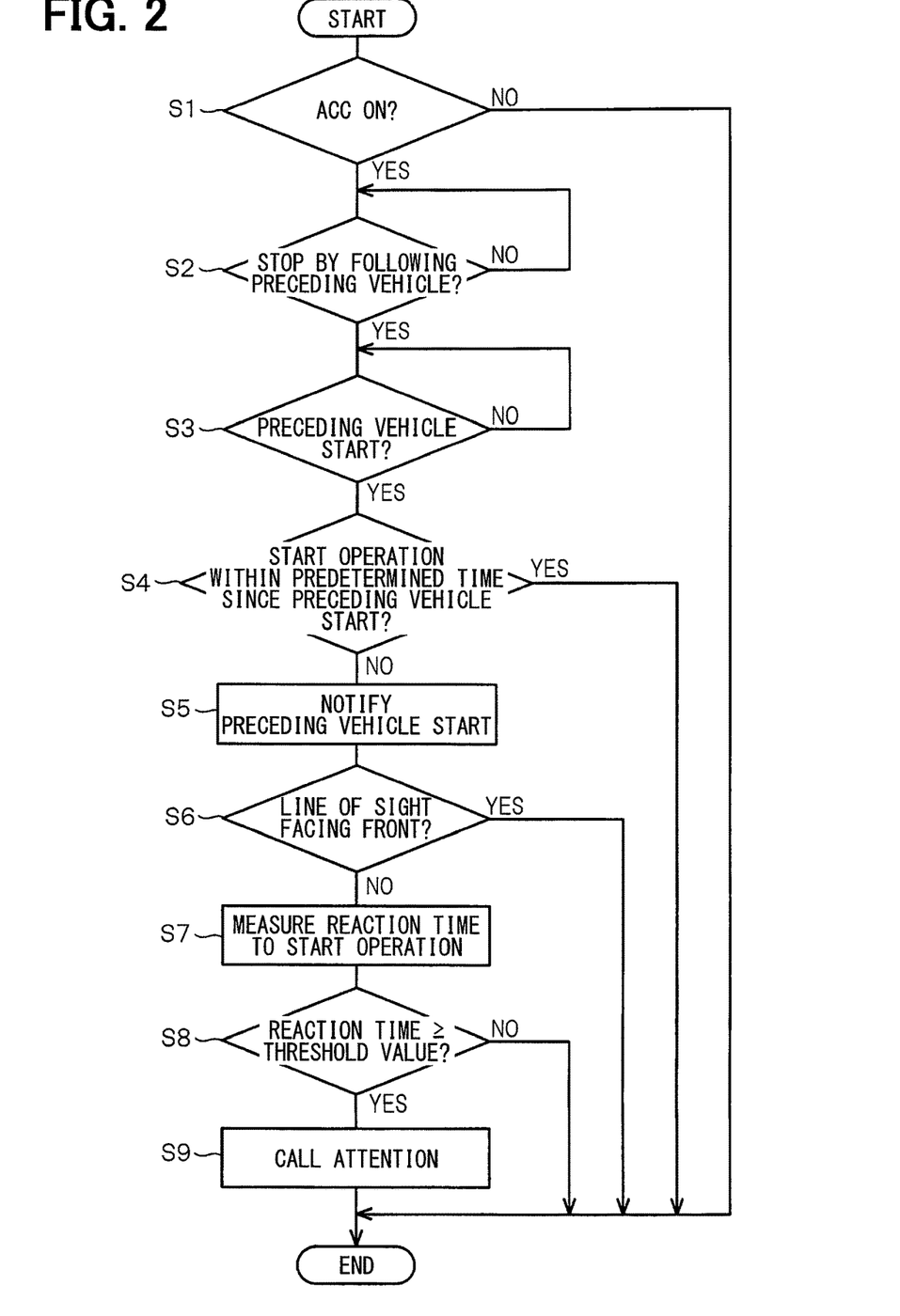
FIG. 2 is a flowchart showing a process of a driver state determination.

Hereinafter, a first embodiment will be described with reference to FIG. 1 and FIG. 2. In the first embodiment, the present disclosure is applied to a vehicle (automobile) having an adaptive cruise control (hereinafter abbreviated as "ACC") function as a driving assistance apparatus. FIG. 1 schematically shows a configuration of a vehicle driver state determination apparatus 1 according to the present embodiment mounted on a vehicle including an ACC function. Note that the vehicle in which the driver state determination apparatus 1 is mounted may be also referred to as a host vehicle, as needed. The vehicle driver state determination apparatus 1 includes a driver state determination control unit 2, an attention calling unit 3, and a driver face direction detection unit 4; such units 2 to 4 may be each configured to be a control circuit.

As one of examples of the present disclosure, in the present embodiment, the driver state determination control unit 2 is mainly configured to include a computer containing a CPU and a storage such as ROM, RAM. As will be described later, the driver state determination control unit 2 executes a driver state determination program stored in the ROM to execute a process to determine whether the driving ability is reduced due to a driver state such as a fatigue, drowsiness, low alertness. In addition, the attention calling unit 3 is to call attention by display using a display or sound using a speaker when fatigue or the like is determined to be arising in the driver. The driver face direction detection unit 4, which may be also referred to as a direction detection unit, may include an image processor processing an image from an in-vehicle camera (none shown), etc., to detect whether the driver's line of sight (i.e., sight-line) or the direction of the face faces as area in front of the vehicle.

The driver state determination control unit 2, the attention calling unit 3, and the driver face direction detection unit 4 are connected to an in-vehicle LAN 5 such as a CAN (Controller Area Network) serving as an in-vehicle communication link. The in-vehicle LAN 5 is further connected with an ACC control unit 6, a preceding vehicle start notification unit 7, a steering switch unit 8, an accelerator control unit 9, a brake control unit 10; such units may be each configured to be a control circuit. Although not shown in the drawings, in order to realize the ACC function, various devices are further connected to the in-vehicle LAN 5. Various devices include (i) various in-vehicle sensors such as an outside-vehicle camera for photographing the surroundings (front and rear) of the vehicle, a laser radar for detecting a distance to a preceding vehicle or an obstacle, a vehicle position detection apparatus for detecting the position of the host vehicle, a map database for storing road map data, a communication apparatus for performing inter-vehicle communication or road-to-vehicle communication, and (ii) various in-vehicle output devices outputting information/message/notice visually, audibly, tactually, such as a display, a speaker, a vibrator.

The ACC control unit 6 realizes an adaptive cruise control (ACC) function when the ACC function is turned on (i.e., under an execution of the ACC function) by an operation instruction by the driver. This ACC function controls the accelerator control unit 9, the brake control unit 10, etc. to automatically drive the host vehicle to follow a preceding vehicle with a constant inter-vehicle distance to the preceding vehicle. When the ACC function is executed, in response to that the preceding vehicle stops due to, for example, a traffic signal, the host vehicle stops behind the preceding vehicle by following the preceding vehicle stopping. Thereafter, when the preceding vehicle starts, the preceding vehicle start notification unit 7 notifies the driver that the preceding vehicle has started by outputting sounds and displaying on a display.

Then, upon receiving a specific notification notifying that the preceding vehicle has started, the driver performs a starting operation of the vehicle as a predetermined driving operation according to the specific notification. This starting operation is performed by turning on the steering switch of the steering switch unit 8 or turning on (depressing) the accelerator. In response to the starting operation, the ACC control unit 6 resumes the follow-up traveling following the preceding vehicle. Therefore, in the present embodiment, when the preceding vehicle has started after having stopped under the state where the ACC function is executed, it is regarded as a specific event having occurred. Also, the preceding vehicle start notification is included in a specific notification.

In the present embodiment, the driver state determination control unit 2 determines whether the driving ability is reduced due to the driver's state such as fatigue, low alertness, drowsiness, or the like. At this time, the driver state determination control unit 2 mainly determines whether a specific notification for prompting the driver to perform a predetermined driving operation is issued from the driving assistance apparatus in accordance with an occurrence of a specific event. Such a process may be mainly by its software configuration, for instance. Then, after the specific notification is issued, the reaction time is measured to provide a time measurement result; the reaction time is defined as a reaction period of time from when the specific notification is issued to when a predetermined driving operation corresponding to the specific notification is performed by the driver. The state regarding the driving ability of the driver is evaluated or determined from the time measurement result.

More specifically, as described also in the following operation explanation (flowchart explanation), the driver state determination control unit 2 determines whether a notification notifying a start of a preceding vehicle is issued as a specific notification under an execution of the ACC function. That is, the notification of a start of a preceding vehicle is issued in response to the preceding vehicle has started after the preceding vehicle stops and the host vehicle then stops for following the preceding vehicle stopping. Then, the reaction time is measured from when the specific notification is issued to when the starting operation of starting the host vehicle is performed by the driver. When the time measurement result of the reaction time is equal to or greater than a threshold value, the response delay (i.e., a reduction in the driving ability) of the driver is determined.

At this time, in the present embodiment, in response to determining an issuance of a notification of a start of the preceding vehicle as an issuance of a specific notification, the driver state determination control unit 2 performs measurement of the reaction time and evaluation of the state under conditions that it is determined that the line of sight of the driver or the direction of the face of the driver is not facing an area in front of the vehicle based on the detection by the driver face direction detection unit 4. Furthermore, in the present embodiment, in cases where a predetermined driving operation, that is, a starting operation by the driver has not been performed even though a predetermined period of time has elapsed since the preceding vehicle started after once having stopped, the driver state determination control unit 2 does not determine a fatigue or the like. The driver state determination control unit 2 determines that the driver has an intention not to perform any starting operation.

Next, the operation of the above configuration will be described with reference to FIG. 2. The flowchart of FIG. 2 schematically shows a process of driver state determination executed by the driver state determination control unit 2 while the vehicle is traveling. That is, first, in S1, it is determined whether the ACC is on or not. When the ACC function is turned off (No in S1), the process is ended.

When the function of the ACC is on (Yes in S1), it is determined in next S2 whether the host vehicle has stopped so as to follow a preceding vehicle stopping. In the case where the host vehicle has stopped so as to follow the preceding vehicle (Yes in S2), it is determined in next S3 whether the preceding vehicle has started. In this case, the fact that the preceding vehicle has started is a specific event, and the driver performs a starting operation of turning on the steering switch of the steering switch unit 8 or turning on the accelerator (stepping on), as a predetermined driving operation. The host vehicle thereby resumes traveling by following the preceding vehicle.

When the preceding vehicle has started (Yes in S3), it is determined in next S4 whether there is no starting operation in the host vehicle even when a predetermined period of time has elapsed since the preceding vehicle started. In this case, the predetermined period of time is set to about 1 to 2 seconds, for example, 1.5 seconds. When there is a starting operation before a predetermined period of time has elapsed (Yes in S4), it is determined that the state of the driver is normal (there is no reduction in driving ability), and the process is ended.

On the other hand, when there is no starting operation even when a predetermined period of time has elapsed (No in S4), the process proceeds to S5 in which the preceding vehicle start notification unit 7 issues a preceding vehicle start notification notifying that the preceding vehicle has started. This notification is performed by, for example, display notification (i.e., visually) on a display or meter indicator, and sound notification (i.e., audibly) such as a chime sound (buzzer sound). In addition to display notification and sound notification, vibration notification using a vibrator of vibrating the steering wheel or the like (i.e., tactually) may be added.

In response to that the preceding vehicle start notification is issued by the preceding vehicle start notification unit 7, in next S6, it is determined whether the line of sight of the driver or the direction of the face of the driver is facing an area in front of the vehicle based on the detection by the driver face direction detection unit 4. When the line of sight of the driver or the direction of the face is facing the area in front (Yes in S6), the process is ended. When the driver's line of sight or the face direction is not facing the area in front (No in S6), the process proceeds to S7, where the reaction time from the issuance of the specific notification to the starting operation by the driver is measured.

Then, in S8, it is determined whether the measured reaction time is equal to or greater than a threshold value (for example, 600 msec). When the reaction time is less than the threshold value (No in S8), it is determined that the state of the driver is normal (there is no reduction in driving ability) and the process is ended. On the other hand, when the reaction time is equal to or greater than the threshold value (Yes in S8), it is determined that the driver is in a state where the driving ability is reduced due to fatigue or the like, and attention is called in S9. This attention calling is made by, for example, displaying on the display urging the driver to take a break such as "Take a break since you are tired". Thereafter, the process ends.

As described above, the vehicle driver state determination apparatus 1 of the present embodiment is provided in a vehicle including an ACC function as a driving assistance apparatus, to determine a state of a driver of the vehicle. The state relating to the driving ability of the driver is evaluated based on the reaction time against a specific notification, which is accompanied by a predetermined driving operation and is given to the driver by the ACC function. In this case, the driver state evaluation is performed based on the fact that the driver performs a predetermined driving operation that is practically needed in driving; such a predetermined driving operation needed practically for driving is different from an operation, which is performed to start to measure a reaction time but is irrelevant to the driving. The present embodiment therefore provides an excellent effect that enables the determination of the state of the driver without making the driver feel annoying during normal driving.

In particular, the present embodiment employs the following: (i) the driving assistance apparatus executing the ACC function issues, as a specific notification, a preceding vehicle start notification notifying that a preceding vehicle has started after the preceding vehicle stopped and the host vehicle stopped so as to follow the preceding vehicle, and (ii) the driver thereby performs an operation of starting the host vehicle. That is, the evaluation is made based on measuring the reaction time from an issuance of the notification of the start of the preceding vehicle to the operation of starting the host vehicle by the driver. Thus, when the reaction time is greater than a threshold value, it may be determined with sufficient certainty that the fatigue of the driver is large. In addition, the reaction delay is a scene that the driver can feel, and there is also an advantage that enhances the acceptability of the advice.

Further, the present embodiment is provided with the driver face direction detection unit 4 that detects the driver's line of sight or the direction of the face. On condition that the line of sight (i.e., sight-line direction) or face direction of the driver is not facing an area in front of the vehicle when a specific notification is given, the reaction time is measured and the state is evaluated accordingly. Here, when the line of sight or the face of the driver faces the area in front, the driver is supposed to be looking at an area in front of the vehicle, that is, looking at the preceding vehicle. The driver can thus recognize that the preceding vehicle has started despite not receiving the notification. The driver himself or herself can thus perform a self-determination of the preceding vehicle having started, and perform the starting operation. In such a case, it is impossible to accurately obtain the reaction time against the issuance of the preceding vehicle start notification. On the other hand, when the driver's line of sight or face direction is not facing an area in front, that is, when the driver is not looking forward, the above self-determination may be excluded. Therefore, it is possible to more accurately obtain the reaction time against the issuance of the preceding vehicle start notification, and it is possible to reliably determine the state of the driver.

Furthermore, in the present embodiment, in the case where a predetermined driving operation (starting operation) by the driver has not been performed even though a certain period of time has elapsed since the occurrence of a specific event (i.e., the start of the preceding vehicle), it is determined that the driver intends not to perform any starting operation. Here, even when the preceding vehicle starts, there are also cases where it is necessary to start the vehicle after confirming the safety of the surroundings such as a pedestrian. In such cases, the driver intentionally selects not to perform a starting operation. In the case where despite a predetermined period of time (for example, 1.5 seconds) having elapsed since the start of the preceding vehicle, the starting operation has not been performed, it is determined that the driver intends not to perform a starting operation. This allows a more reliable and accurate determination of the driver state that matches an actual situation.

(2) Second Embodiment

Next, a second embodiment will be described with reference to FIG. 3. The second embodiment differs from the first embodiment in the following points. First, the vehicle is provided with a pedestrian's running out detection function included in the driving assistance apparatus. This pedestrian's running out detection function is to detect running out of a pedestrian (e.g., towards or in front of the vehicle) using an image of an in-vehicle camera, for example. In addition to using an image of such an in-vehicle camera, the detection of the pedestrian's running out may be made by acquiring the pedestrian information detected by other vehicles or detected by a detecting device installed on a road via inter-vehicle communication or vehicle-road communication.

The pedestrian's running out detection function detects as a specific event, the running out of a pedestrian toward the front of the vehicle, and issues, as a specific notification, a notification that calls the driver attention to the pedestrian's running out in accordance with the detection thereof (i.e., issuing a notification prompting the driver to perform the deceleration operation). This notification of calling the driver attention to the pedestrian's running out is issued, for example, via display notification using a display or the like and/or via sound notification using a buzzer sound or the like. The deceleration operation includes an operation of turning off the accelerator or turning on the brake.

Then, in the present embodiment, as described in the explanation of the next flowchart, the driver state determination control unit 2 determines an issuance of a notification of calling the driver attention to a pedestrian's running out by the detection function, as an issuance of a specific notification. Then, the reaction time is measured from the issuance of the specific notification to the execution of the deceleration operation by the driver. When the time measurement result of the reaction time is equal to or greater than a first threshold value, the response delay of the driver (i.e., the reduction in the driving ability) is determined and the attention of the driver is called. Further, in the present embodiment, the reaction time is measured and the state is evaluated in response to an issuance of a pedestrian's running out notification on the condition that the direction of sight-line or the direction of face of the driver is not facing an area in front of the vehicle based on the detection by the driver face direction detection unit 4.

Figure 3:
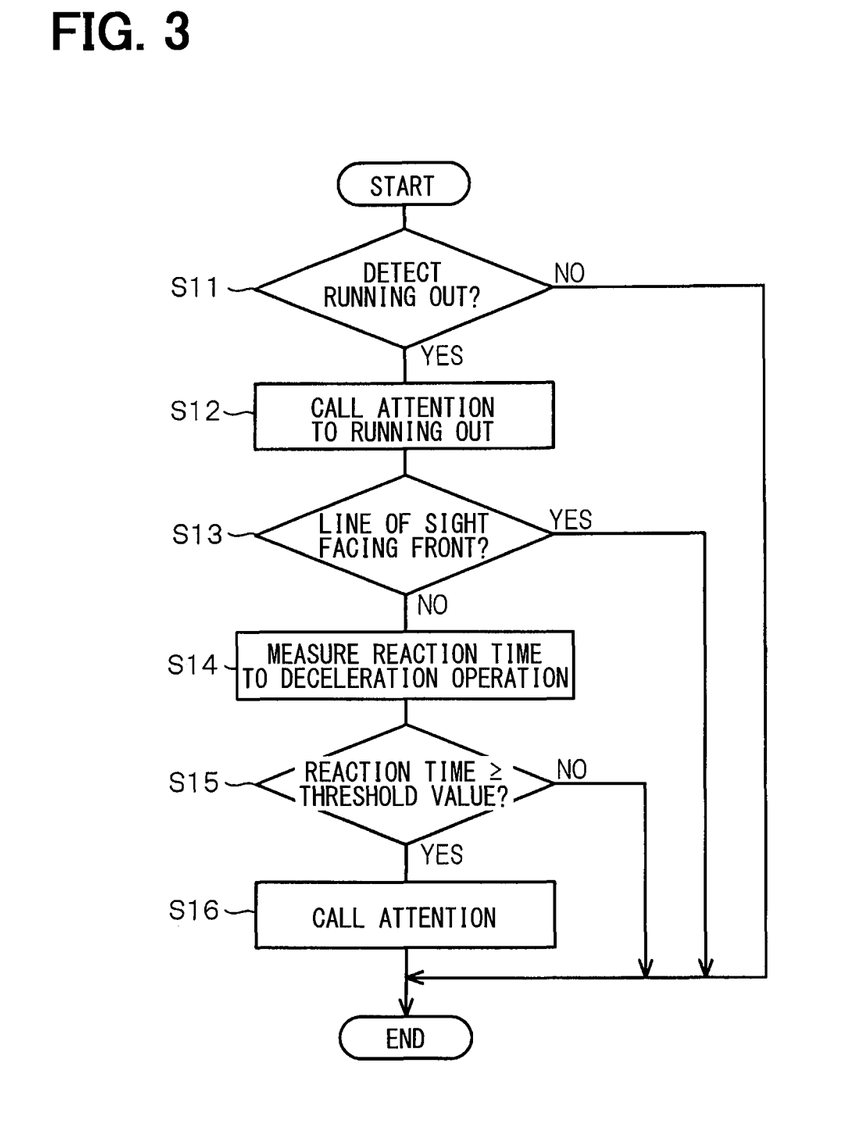
FIG. 3 is a flowchart showing a process of a driver state determination according to a second embodiment.

The flowchart in FIG. 3 schematically shows a process of a driver state determination executed by the driver state determination control unit 2. That is, first, in S11, it is determined whether a pedestrian's running out is detected by the detection function. When the running out is detected (Yes in S11), a notification of calling an attention to running out is issued in next S12. In S13, based on the detection by the driver face direction detection unit 4, it is determined whether the direction of sight-line of the driver or the direction of face of the driver faces an area in front when the notification of calling an attention to running out is issued. When facing an area in front (Yes in S13), the process is ended.

On the other hand, when the direction of sight-line of the driver or the direction of face is not facing an area in front (No in S13), the reaction time is measured in S14 from when the notification of calling an attention to running out to when the deceleration operation is performed by the driver. In S15, it is determined whether the measured reaction time is equal to or greater than a threshold value (for example, 600 msec). When the reaction time is less than the threshold value (No in S15), it is determined that the state of the driver is normal (there is no reduction in driving ability), and the process is ended.

On the other hand, when the reaction time is equal to or greater than the threshold value (Yes in S15), it is determined that the driver is in a state in which the driving ability is reduced due to fatigue or the like. In S16, calling attention is made and the process is ended. In this case as well, when an upper limit value (second threshold value) may be set in S15 and the reaction time exceeds the upper limit value (for example, 1.5 seconds), it is not determined that fatigue or the like arises. Alternatively, it may be determined that the driver intends not to perform any deceleration operation.

Also in the second embodiment, unlike the case that the reaction time is measured when the driver performs an operation not related to a driving operation, the driver may be evaluated based on the fact that the driver performs the driving operation actually required for driving the vehicle. Therefore, the present embodiment may provide an excellent effect that the state of the driver during normal driving is determined without making the driver feel annoying. In addition, as in the first embodiment, the second embodiment excludes the deceleration operation by the driver's self determination when the line of sight of the driver or the face of the driver faces an area in front. Thus the reaction time may be acquired more accurately and the state of the driver may be determined certainly.

In particular, the present embodiment uses (i) the function of detection of running out of a pedestrian as a driving assistance apparatus, and (ii) the driver performing a deceleration operation in response to an issuance of the notification notifying a pedestrian's running out, as an issuance of a specific notification, when such running out is detected. That is, the evaluation is made based on measuring a reaction time from when the issuance of the notification of calling the attention to running out to when a deceleration operation is performed by the driver. Thus, when the reaction time is longer than a threshold value, it may be determined with sufficient certainty that a fatigue of the driver is significant. Also in this case, a reaction delay is a scene that the driver can have a sense; there is also an advantage to enhance the acceptability of the advice.

(3) Third Embodiment

Figure 4:
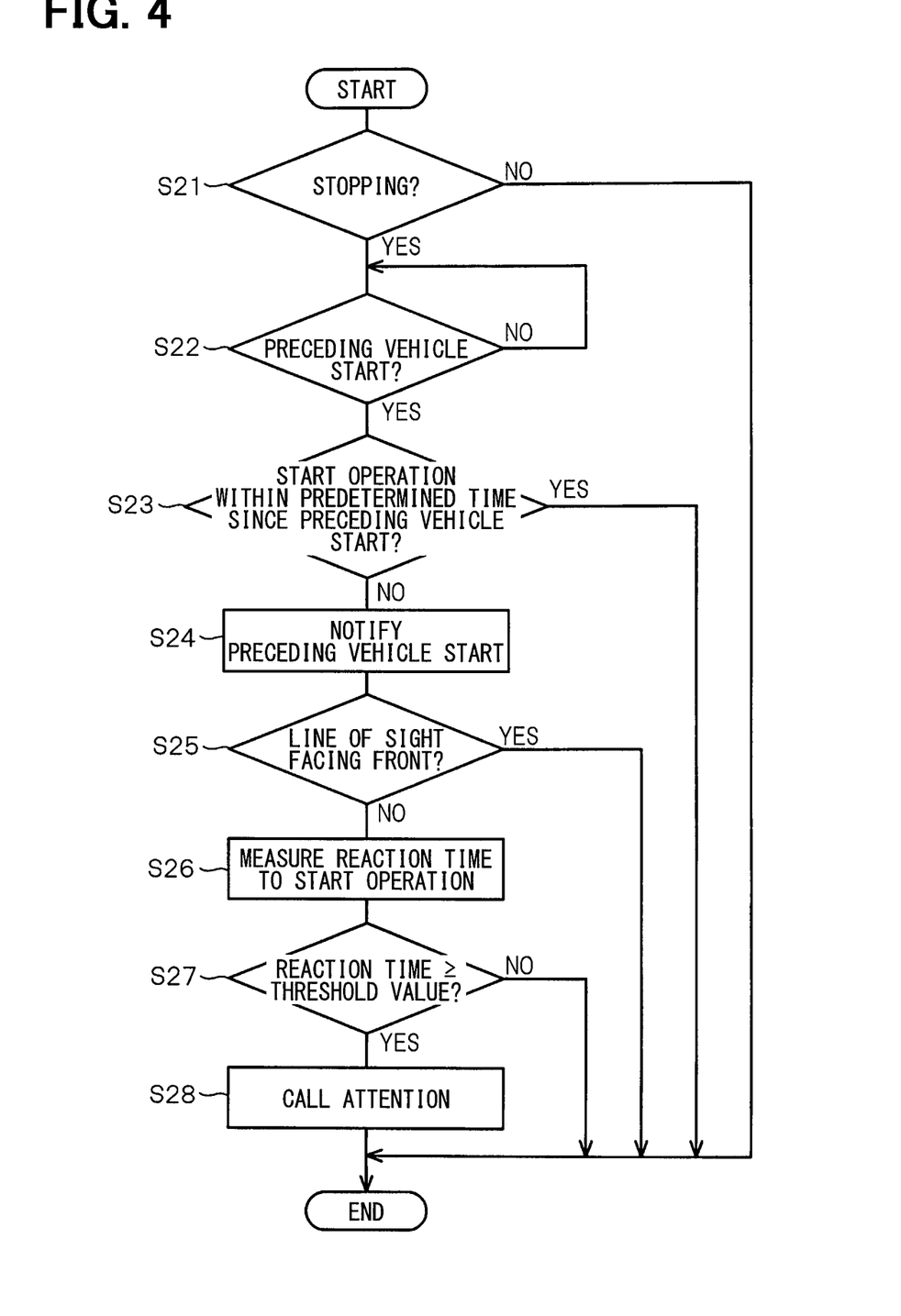
FIG. 4 is a flowchart showing a process of a driver state determination according to a third embodiment.

FIG. 4 shows a third embodiment, which differs from the first embodiment in the following configuration. That is, regardless of the ACC function described in the first embodiment, the present embodiment is configured to use a driving assistance apparatus's function of notifying a start of a preceding vehicle in front of the host vehicle, i.e., to detect a start of such a preceding vehicle which has been stopped, as an occurrence of a specific event. Then, in accordance with the detection, the third embodiment is provided with a function of issuing a notification notifying the driver of the start of a preceding vehicle as a specific notification, by display or sound. Upon receiving a preceding vehicle start notification, the driver performs a predetermined driving operation, i.e., a starting operation which is either a brake off operation or an accelerator on operation in this case.

In the present embodiment, as described in the explanation of the next flowchart, the driver state determination control unit 2 measures a reaction time from when the driver determines that a preceding vehicle start notification is issued as a specific notification to when, after such an issuance of a notification, the driver performs a starting operation. Then, when the measurement result of the reaction time is equal to or greater than a threshold value (e.g., 400 msec), it is evaluated or determined that a response delay of the driver (i.e., the reduction in the driving ability) is arising and attention is called.

At this time, in the present embodiment, the driver state determination control unit 2 performs measurement of a reaction time and evaluation of the driver state under the condition that the driver's line of sight or face direction is not facing an area in front of the vehicle based on the detection by the driver face direction detection unit 4 when a start of a preceding vehicle is notified. Furthermore, in the present embodiment, in cases where a starting operation by the driver has not been performed even though a predetermined period of time (i.e., 1.5 seconds) has elapsed since the preceding vehicle started after once having stopped, the driver state determination control unit 2 does not determine a fatigue or the like. The driver state determination control unit 2 determines that the driver intends not to perform a starting operation.

The flowchart of FIG. 4 schematically shows a process of a driver state determination executed by the driver state determination control unit 2. First, in S21, it is determined whether a preceding vehicle (and the host vehicle) is stopping. When it is determined to be stopping (Yes in S21), in S22 it is determined whether the preceding vehicle has started. When the preceding vehicle has started (Yes in S22), it is determined in next S23 whether there is no starting operation in the host vehicle even when a predetermined period of time (e.g., 1.5 seconds) has elapsed since the preceding vehicle started. When there is a starting operation before a predetermined period of time has elapsed (Yes in S23), it is determined that the state of the driver is normal (there is no reduction in driving ability), and the process is ended.

On the other hand, when there is no starting operation even when a predetermined period of time has elapsed (No in S23), the process proceeds to S24 in which the preceding vehicle start notification unit 7 issues a preceding vehicle start notification notifying that the preceding vehicle has started. In next S25, it is determined whether the line of sight of the driver or the direction of the face of the driver is facing an area in front based on the detection by the driver face direction detection unit 4. When the line of sight of the driver or the direction of the face is facing an area in front (Yes in S25), the process is ended. When the driver's line of sight or the face direction is not facing the area in front (No in S25), the process proceeds to S26, where the reaction time is measured from the issuance of the specific notification to the starting operation by the driver.

Then, in S27, it is determined whether the measured reaction time is equal to or greater than a threshold value (for example, 400 msec). When the reaction time is less than the threshold value (No in S27), it is determined that the state of the driver is normal (there is no reduction in driving ability) and the process is ended. On the other hand, when the reaction time is equal to or greater than the threshold value (Yes in S27), it is determined that the driver is in a state in which the driving ability is reduced due to fatigue or the like, and attention is called in S28.

According to the third embodiment as described above, it is possible to evaluate the driver based on the fact that the driving operation actually required by the driver is performed. This may provide an excellent effect enabling the determination of the state of the driver without causing the driver to feel annoying during normal driving. In addition, as in the first embodiment, since the starting operation by self determination in the case where the line of sight of the driver or the face of the driver faces the front is excluded, the reaction time can be more accurately obtained and the state can be reliably determined. Furthermore, in the case where even though a predetermined period of time has elapsed since the start of the preceding vehicle, the driver did not start the vehicle, it is determined that the driver intends not to start the vehicle. Thus, it is possible to make a more reliable and highly accurate determination of the driver state that matches the actual situation.

In particular, the present embodiment is configured to use the driver assistance apparatus' function of issuing a notification of a start of a preceding vehicle as a specific notification, and to use an operation by the driver such as a brake off operation or accelerator on operation as a predetermined driving operation in response to the issuance of a start notification of the preceding vehicle. That is, the evaluation is made based on measuring a reaction time from when the preceding vehicle start notification is issued to when a starting operation is performed by the driver. Thus, when the reaction time is longer than a threshold value, it may be determined with sufficient certainty that a fatigue of the driver is large. Also in this case, the reaction delay is a scene that the driver can feel, and there is also an advantage to enhance the acceptability of the advice.

(4) Fourth Embodiment

Although not shown, a fourth embodiment is provided as follows. The driving assistance apparatus is provided with a function of notifying that the forward traffic signal changes or has changed to a green signal. That is, the driver state determination control unit 2 determines that there is a notification that the forward traffic signal changes or has changed to a green signal as a specific notification, and measures a reaction time from when the notification is issued to when a brake off operation or accelerator on operation is performed by the driver. Then, when the measurement result of the reaction time is equal to or greater than a threshold value, the response delay of the driver, that is, the reduction in the driving ability is evaluated or determined, and the attention is called.

Also according to the fourth embodiment, when a reaction time is greater than a threshold value, it may be determined with sufficient certainty that a fatigue of the driver is large. In addition, the fourth embodiment provides an effect to determine the state of the driver without making the driver feel annoying during normal driving.

(5) Modification Examples

In each of the above-described embodiments, an attention is called when there is one (one-time) delay of reaction time. However, when several delays of reaction times are repeated (for example, three-time delays), an attention may be called. Attention may be called at a point of time of stoppage. A threshold value may also be set such that the distribution of the reaction times of the driver is stored and a threshold value is set to be later or slower than usual in the distribution.

In addition, various modification examples may be made to an overall hardware configuration of the vehicle driver state determination apparatus, a system or software configuration of the drive assistance apparatus, or the like. Various modifications can be made on the method of notifying and calling attention. Specific numerical values such as a threshold value or a predetermined or constant period of time are merely an example, and they can be appropriately changed. It is also possible to implement the above-described embodiments in any combination.

In addition, in the above embodiments, calling an attention is described to be executed by the driver state determination control unit 2 in S9, S16, or S28 in FIG. 3, FIG. 4, or FIG. 5; in contrast, such calling an attention may be executed by the attention calling unit 3 or by the driver state determination control unit 2 incorporating the attention calling unit 3.

Although the present disclosure has been made in accordance with the embodiments, it is understood that the present disclosure is not limited to such embodiments or configurations. The present disclosure may include various modification examples as well as modifications made within equivalent ranges. In addition, while the various elements are shown in various combinations or configurations, which are exemplary, other combinations or configurations, including more, less or only a single element, are also within the spirit and scope of the present disclosure.

It is noted that, the above embodiments describe the units of the driver state determination control unit 2, the attention calling unit 3, the driver face direction detection unit 4, the ACC control unit 6, the preceding vehicle start notification unit 7, the steering switch unit 8, the accelerator control unit 9, and the brake control unit 10; each unit may be also referred to as or configured as a control circuit.

The example configurations of each of such respective control circuits are described in the above embodiments; furthermore, other example configurations of such a control circuit may be additionally employed. Thus, the example configurations of such a control circuit may be summarized as below.

That is, a control circuit, which may be also referred to as a control unit, a controller, an electronic control unit, or the like, may be combined with another control circuit, or be divided into several control circuits (i.e., a control circuit may be provided as at least one control circuit).

Such at least one control circuit provides a plurality of functions and may include sections to provide the respective functions. In addition, a flowchart or sequence executed by a control circuit includes sections, e.g., each represented as S1, S2, or the like executed by the driver state determination control unit 2 in the above embodiments. Several sections may be combined into a single section; one section may be divided into several sections. Each section may be also referred to or achieved as a processor, device, or the like.

Furthermore, (i) an individual one of the sections, processors, devices, or the like included in at least one control circuit, or (ii) an individual control circuit of the at least one control circuit may be achieved by using or by including (i) at least one hardware circuit including analog circuit and/or digital circuit (with or without a function of a related apparatus), or (ii) at least one processing unit (such as a CPU in a computer) along with memory storing instructions (such as a non-transitory tangible computer-readable storage medium storing instructions of program executed by the CPU), or (iii) a combination of the at least one hardware circuit and the at least one processing unit along with memory storing instructions, to thereby provide the functions.

In addition, at least one control circuit may be provided by including or by being accompanied by a storage, an interface communicating with an external apparatus, and an internal communication line connecting the foregoing components to each other, along with or without a function of a related apparatus.

For reference to further explain features of the present disclosure, a comparative technique is described as follows.

There is a comparative driving ability reduction determination apparatus as a technique for determining a reduction in driving ability due to fatigue or the like of a driver who drives a vehicle, for example, an automobile. While the vehicle is traveling, the driving ability reduction determination apparatus is configured to display a virtual image on the windshield as an image used for measurement. The driving ability reduction determination apparatus is further configured (i) to measure a reaction time to when the driver operates a predetermined button used for measurement by reacting to the light stimulus of the displayed image used for measurement, (ii) to determine the reduction in the driving ability based on the reaction time, and (iii) to call attention as necessary.

The technique described above requires the driver to perform an additional operation onto the button in addition to the driving operation while the vehicle is running, that is, while the driver is driving the vehicle. Such an additional operation is troublesome for the driver.

It is thus desirable to provide a vehicle driver state determination apparatus capable of determining a state of a driver without causing the driver to feel annoyed during normal driving operation.

Aspects of the disclosure described herein are set forth in the following clauses.

According to a first aspect of the present disclosure, a vehicle driver state determination apparatus provided in a vehicle including a driving assistance apparatus may be provided to determine a state of a driver of the vehicle by including a determination device, which may correspond to S5, S12, or S24, a time measurement device, which may correspond to S7, S14, or S26, and an evaluation device, which may correspond to S8, S15, or S27. The determination device may be configured to determine that a specific notification is issued to the driver from the driving assistance apparatus in response to an occurrence of a specific event, the specific notification urging the driver to perform a predetermined driving operation. The time measurement device may be configured to measure a reaction time from when the specific notification is issued to when the predetermined driving operation is performed by the driver, to provide a time measurement result. The evaluation device may be configured to evaluate a state relating to a driving ability of the driver from the time measurement result.

According to such a configuration of the first aspect, the determination device performs a determination of an issuance of a specific notification, which is to be accompanied by a predetermined driving operation by a driver, from the driving assistance apparatus. Following the determination, the time measurement device measures a reaction time from when the specific notification is issued to when the predetermined driving operation is performed by the driver. Then, from the time measurement result by the time measurement device, the state relating to the driving ability of the driver is evaluated by the evaluation device. In this case, the driver state evaluation is performed based on the fact that a predetermined driving operation that is practically needed by the driver is performed; such a predetermined driving operation needed practically for driving is different from an operation, which is performed so as to start to measure a reaction time but is irrelevant to the driving operation. This enables the determination of the state of the driver without causing the driver to feel annoyed during normal driving.

What is claimed is:

1. A vehicle driver state determination apparatus provided in a vehicle including a driving assistance apparatus, the vehicle driver state determination apparatus determining a state of a driver of the vehicle, comprising:
   a determination device configured to determine that a specific notification is issued to the driver from the driving assistance apparatus in response to an occurrence of a specific event, the specific notification urging the driver to perform a predetermined driving operation;
   a time measurement device configured to measure a reaction time from when the specific notification is issued to when the predetermined driving operation is performed by the driver, to provide a time measurement result; and
   an evaluation device configured to evaluate a state relating to a driving ability of the driver from the time measurement result.

2. The vehicle driver state determination apparatus according to claim 1, further comprising:
   a direction detection unit configured to detect either a sight-line direction of the driver or a face direction of the driver, wherein
   in response to that the determination device determines that the specific notification is issued under a condition that either the sight-line direction of the driver or the face direction of the driver detected by the direction detection unit fails to face an area in front of the vehicle, the reaction time is measured by the time measurement device and the state is evaluated by the evaluation device.

3. The vehicle driver state determination apparatus according to claim 1, wherein:
   the driving assistance apparatus includes an adaptive cruise control function;
   the determination device determines that a preceding vehicle start notification is issued as the specific notification from the driving assistance apparatus that is under an execution of the adaptive cruise control function, the preceding vehicle start notification indicating that a preceding vehicle has started after the preceding vehicle stopped and the vehicle then stopped by following the preceding vehicle;
   the time measurement device measures the reaction time to when a starting operation of starting the vehicle is performed as the predetermined driving operation by the driver; and
   in response to that the time measurement result of the reaction time is equal to or greater than a threshold value, the evaluation device determines a reaction delay of the driver.

4. The vehicle driver state determination apparatus according to claim 1, wherein:
   the driving assistance apparatus includes a function of detecting a pedestrian running out and issuing a pedestrian running out notification indicating that a pedestrian runs out;

the determination device determines that the pedestrian running out notification is issued as the specific notification;

the time measurement device measures the reaction time to when a decelerating operation of decelerating the vehicle is performed as the predetermined driving operation by the driver; and in response to that the time measurement result of the reaction time is equal to or greater than a threshold value, the evaluation device determines a reaction delay of the driver.

5. The vehicle driver state determination apparatus according to claim 1, wherein:

the driving assistance apparatus includes a function of issuing a preceding vehicle start notification indicating a start of a preceding vehicle;

the determination device determines that the preceding vehicle start notification is issued as the specific notification;

the time measurement device measures a reaction time to when a brake off operation or an accelerator on operation is performed as the predetermined driving operation by the driver; and in response to that the time measurement result of the reaction time is equal to or greater than a threshold value, the evaluation device determines a reaction delay of the driver.

6. The vehicle driver state determination apparatus according to claim 1, wherein:

the driving assistance apparatus includes a function of issuing a notification of a forward traffic signal changing to a green signal;

the determination device determines that the notification of the forward traffic signal changing to the green light is issued as the specific notification;

the time measurement device measures a reaction time from when the notification of the forward traffic signal changing to the green light is issued to when a brake off operation or an accelerator on operation is performed as the predetermined driving operation by the driver; and in response to that the time measurement result of the reaction time is equal to or greater than a threshold value, the evaluation device determines a reaction delay of the driver.

7. The vehicle driver state determination apparatus according to claim 1, wherein in response to that the predetermined driving operation has not been performed by the driver despite a predetermined period of time having elapsed since the occurrence of the specific event, the evaluation device determines that the driver has an intention not to perform a driving operation.

8. The vehicle driver state determination apparatus according to claim 1, wherein:

the time measurement is further configured to provide the measured reaction time as the time measurement result to evaluate the state relating to the driving ability of the driver; and the evaluation device is further configured to determine whether the measured reaction time is equal to or greater than a threshold value, and to alert the driver that the driver is in a state where the driving ability of the driver is reduced, in response to determining that the measured reaction time is equal to or greater than the threshold value.

9. A vehicle driver state determination apparatus provided in a vehicle, comprising:

at least one control circuit connected with a driving assistance apparatus via a communication link, the at least one control circuit being configured to determine that a specific notification is issued to the driver from the driving assistance apparatus at least visually or audibly or tactually by using an in-vehicle output device in response to an occurrence of a specific event during driving of the vehicle, the specific notification urging the driver to perform a predetermined driving operation to drive the vehicle, to measure, in response to determining that the specific notification is issued, a reaction time from when the specific notification is issued to when the predetermined driving operation is performed by the driver to operate either a brake or an accelerator, to provide the measured reaction time as a time measurement result to evaluate a state relating to a driving ability of the driver, to determine whether the measured reaction time is equal to or greater than a threshold value, and to alert the driver that the driver is in a state where the driving ability of the driver is reduced, in response to determining that the measured reaction time is equal to or greater than the threshold value.

10. The vehicle driver state determination apparatus according to claim 9, further comprising:

at least one different control circuit connected with the at least one control circuit via a communication link, the at least one different control circuit including a processor processing an image of the driver captured by a camera communicating with the processor, the processor being configured to detect a direction of a driver face of the driver that is either a sight-line direction of the driver or a face direction of the driver based on the processed image, the at least one different control circuit providing a result of the detected direction of the driver face, wherein in response to that the specific notification is determined to be issued under a condition that the direction of the driver face is determined to fail to face an area in front of the vehicle based on the result of the detected direction of the driver face from the at least one different control circuit, the at least one control circuit measures the reaction time to evaluate the state relating to the driving ability of the driver.

11. The vehicle driver state determination apparatus according to claim 9, wherein:

the in-vehicle output device includes at least one of a display or a speaker or a vibrator.

12. The vehicle driver state determination apparatus according to claim 9, wherein:

the driving assistance apparatus includes an adaptive cruise control function; and the at least one control circuit is further configured to determine that a preceding vehicle start notification is issued as the specific notification from the driving assistance apparatus that is under an execution of the adaptive cruise control function, the preceding vehicle start notification indicating that a preceding vehicle has started after the preceding vehicle stopped and the vehicle then stopped by following the preceding vehicle, to measure the reaction time to when a starting operation of starting the vehicle is performed as the predetermined driving operation by the driver, and to determine a reaction delay of the driver in response to the time measurement result of the reaction time being equal to or greater than a threshold value.

13. The vehicle driver state determination apparatus according to claim 9, wherein:
the driving assistance apparatus includes a function of detecting a pedestrian running out and issuing a pedestrian running out notification indicating that a pedestrian runs out; and
the at least one control circuit is further configured
to determine that the pedestrian running out notification is issued as the specific notification,
to measure the reaction time to when a decelerating operation of decelerating the vehicle is performed as the predetermined driving operation by the driver, and
to determine a reaction delay of the driver in response to the time measurement result of the reaction time being equal to or greater than a threshold value.

14. The vehicle driver state determination apparatus according to claim 9, wherein:
the driving assistance apparatus includes a function of issuing a preceding vehicle start notification indicating a start of a preceding vehicle; and
the at least one control circuit is further configured
to determine that the preceding vehicle start notification is issued as the specific notification,
to measure a reaction time to when a brake off operation or an accelerator on operation is performed as the predetermined driving operation by the driver, and
to determine a reaction delay of the driver in response to the time measurement result of the reaction time being equal to or greater than a threshold value.

15. The vehicle driver state determination apparatus according to claim 9, wherein:
the driving assistance apparatus includes a function of issuing a notification of a forward traffic signal changing to a green signal; and
the at least one control circuit is further configured
to determine that the notification of the forward traffic signal changing to the green light is issued as the specific notification,
to measure a reaction time from when the notification of the forward traffic signal changing to the green light is issued to when a brake off operation or an accelerator on operation is performed as the predetermined driving operation by the driver, and
to determine a reaction delay of the driver.

16. The vehicle driver state determination apparatus according to claim 9, wherein
in response to the predetermined driving operation having not been performed by the driver despite a predetermined period of time having elapsed since the occurrence of the specific event, the at least one control circuit is further configured to determine that the driver has an intention not to perform a driving operation.

17. A vehicle driver state determination apparatus provided in a vehicle, comprising:
at least one control circuit connected with a driving assistance apparatus via a communication link, the at least one control circuit being configured
to determine that a specific notification is issued to the driver from the driving assistance apparatus at least visually, audibly, or tactually by using an in-vehicle output device, in response to an occurrence of a specific event, the specific notification urging the driver to perform a predetermined driving operation,
to measure, in response to determining that the specific notification is issued, a reaction time from when the specific notification is issued to when the predetermined driving operation is performed by the driver to operate either a brake or an accelerator, and
to provide a time measurement result to evaluate a state relating to a driving ability of the driver, wherein:
the at least one control circuit is further configured
to determine that a preceding vehicle start notification is issued as the specific notification from the driving assistance apparatus that is under an execution of the adaptive cruise control function, the preceding vehicle start notification indicating that a preceding vehicle has started after the preceding vehicle stopped and the vehicle then stopped by following the preceding vehicle,
to measure the reaction time to when a starting operation of starting the vehicle is performed as the predetermined driving operation by the driver, and
to determine a reaction delay of the driver in response to the time measurement result of the reaction time being equal to or greater than a threshold value.

* * * * *